Figure 1:
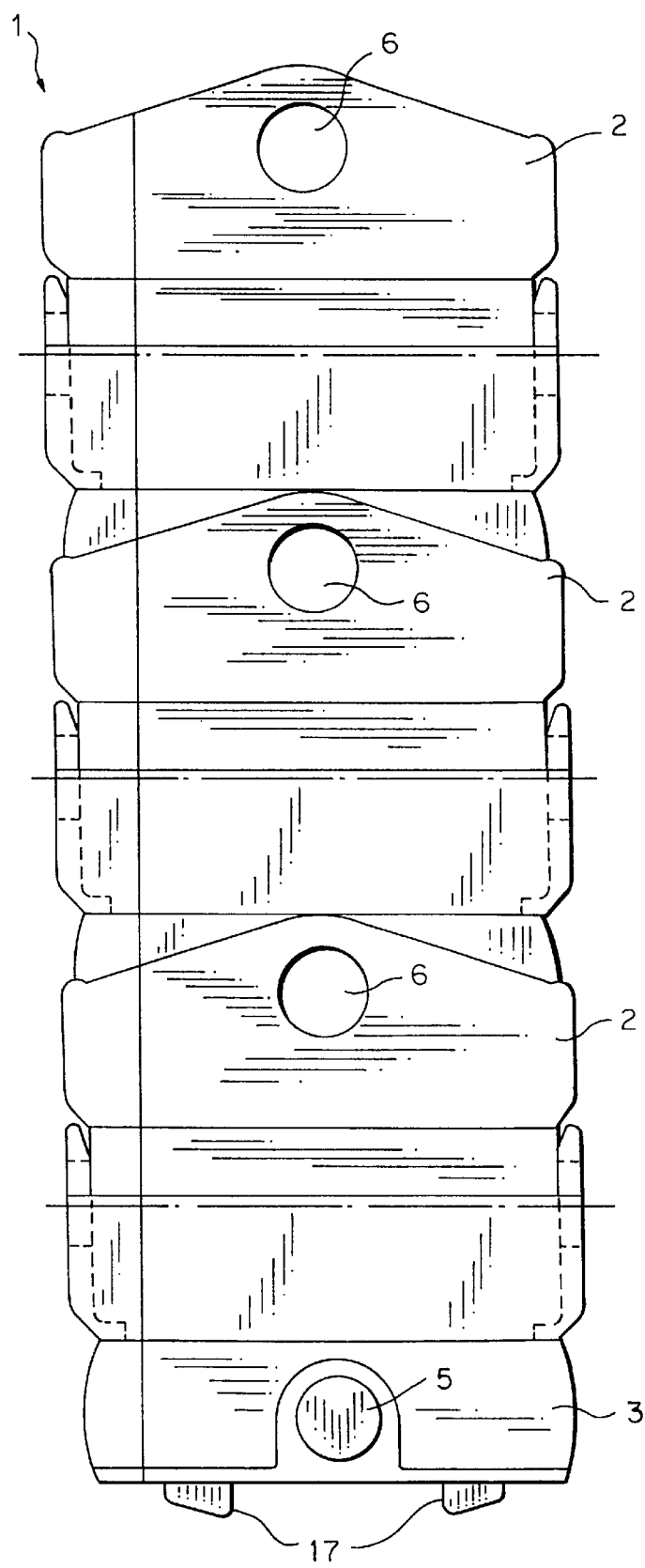

United States Patent [19]
Blase

[11] Patent Number: 5,839,476
[45] Date of Patent: Nov. 24, 1998

[54] CABLE GUIDE

[75] Inventor: Günter Blase, Bergisch Gladbach, Germany

[73] Assignee: Igus Spritzgussteile Fur Die Industrie GmbH, Cologne, Germany

[21] Appl. No.: 495,457

[22] PCT Filed: Jan. 27, 1994

[86] PCT No.: PCT/DE94/00085

§ 371 Date: Aug. 9, 1996

§ 102(e) Date: Aug. 9, 1996

[87] PCT Pub. No.: WO94/18735

PCT Pub. Date: Aug. 18, 1994

[30] Foreign Application Priority Data

Feb. 1, 1993 [DE] Germany ............... P 43 02 757.1

[51] Int. Cl.$^6$ .................................................. F16L 27/04
[52] U.S. Cl. .................. 138/120; 138/110; 138/118; 285/166; 285/223; 285/264
[58] Field of Search ................... 138/110, 120, 138/155; 285/223, 264, 166; 174/68.3

[56] References Cited

U.S. PATENT DOCUMENTS

| 2,177,128 | 10/1939 | Johnson | 138/110 |
| 4,367,967 | 1/1983 | Albert, Jr. | 138/110 X |
| 4,396,797 | 8/1983 | Sakuragi et al. | 138/110 X |
| 4,716,604 | 1/1988 | Watkins | 138/110 X |
| 4,739,801 | 4/1988 | Kimura et al. | 138/120 |
| 5,046,764 | 9/1991 | Kimura et al. | 138/120 X |
| 5,069,486 | 12/1991 | Kimura et al. | 138/120 X |
| 5,143,123 | 9/1992 | Richards et al. | 138/110 X |
| 5,215,338 | 6/1993 | Kimura et al. | 138/120 X |
| 5,469,201 | 11/1995 | Erickson et al. | 138/120 X |

FOREIGN PATENT DOCUMENTS

| 2 220 044 | 4/1972 | Germany . |
| 39 30 291 | 9/1989 | Germany . |

*Primary Examiner*—Patrick F. Brinson
*Attorney, Agent, or Firm*—Browdy and Neimark

[57] ABSTRACT

A cable guide (1) consisting of articulated, partially overlapping individual components (2, 3), where the articulation axes (7, 8) of the components (2, 3) run transversely to the longitudinal axis of the cable guide and the individual components (2, 3) are connected together in such a way that the articulation axes (7, 8) of two adjacent components (2, 3) are positioned at 90° to one another. The components (2, 3) include two different alternating basic shapes and each have a removable, snap-on cover (11, 12), where the covers (11, 12) of the cable guide (1) are all directed to one side of the cable guide (1).

6 Claims, 4 Drawing Sheets

CABLE GUIDE

The invention relates to a cable guide consisting of articulated individual components which are open at the front and made of elastomeric plastic, where the articulation axes of the joints run transversely to the longitudinal axis of the cable guide and the individual components are linked together, at least in sections, in such a way that the articulation axes of two adjacent components are positioned at 90° to one another.

This kind of chain is known from DE-OS 2 220 044, for example.

As regards the rotation of several adjacent components, these kinds of cable guides have two degrees of freedom and can thus be angled in several directions over long sections. They serve to protect cables from tensile stress, excessive bending stress and other external influences. These cable guides known from prior art consist of identical components in the sections in which they have two degrees of rotational freedom, where every second component is positioned at 90° to the longitudinal axis of the cable guide. The components can have a largely rectangular cross-section, where the angular deflection of the components relative to one another is limited in order to protect the cable inside from excessive bending stress. The articulated components form a cable duct into wich the cables can only be inserted through the entry and exit openings located at the ends along the longitudinal axis of the cable guide. It often proves to be very tedious to insert the cables into relatively long cable guides, especially if the cable guide is angled several times in various directions and must carry several cables.

In the case of cable guides, or so-called energy guide chains, which, as for example described in DE 39 30 291 C2, have one degree of freedom, it has been standard practice for some time to equip them with removable covers, which then permit the cables to be easily inserted into the cable guide from one side. However, in the case of cable guides of the type described at the beginning, this method results in considerable difficulties due to the fact that the individual components are each arranged at a rotational angle to one another.

Thus, the task of the invention is to further develop a cable guide of the type described at the beginning, such that the cables can be easily inserted into it.

The task is solved in that two different, alternating basic shapes are included for the components in the section concerned, each of which has an openable wall element which extends across the entire length of the component concerned and is positioned in such a way that the openable wall elements of adjacent components with offset articulation axes are located on the same side of the cable guide, with each component having opposing holes and matching opposing pins in order to form an articulated connection with two adjacent components and one component having a cover, which constitutes the openable wall element of this component, provided with a hole and the adjacent component having a cover, which constitutes the openable wall element of this component, provided with a pin.

This expediently results in a cable guide with two degrees of freedom, where all openable wall elements are positioned on one side of the cable guide. In this context, the wall elements extend across the entire length of the component concerned so that, when they are opened, the cable guide has a continuous opening along its longitudinal axis on one side. Starting at one end of the cable guide, the wall elements can be easily opened one after the other, so that the cables can be inserted effortlessly. In order to form an articulated connection between one individual component and two adjacent components, the components have opposing holes and matching opposing pins, where one component has a cover provided with a hole and the adjacent component has a cover provided with a pin. The holes and pins represent the respective articulation axes. This means that the holes are positioned at an angle of 90° to the opposing pins in at least some of the components.

Except for their front sides including the openable wall elements, the components are preferably of largely closed design and partially overlap. A virtually closed cable duct is formed due to the fact that the components partially overlap.

The openable wall elements are preferably designed as removable, snap-on covers. However, it is also possible to design the covers to open on only one side, so that they cannot get lost when opening the cable guide. A hinge, for example, can be provided on one side of the cover for this purpose.

The connection of the covers to the components is expediently designed as a tongue-and-groove joint. To this end, the sides of the covers which rest on the body of the components can each be provided with an elongated groove which interlocks with the corresponding tongues of the components.

The tongue-and-groove connection can be designed to snap together positively, in order to guarantee the tight fitting of the covers.

The invention also includes the fact that the cable guide can also have sections of identically designed components which have only one degree of rotational freedom, so that some sections of the cable guide can only be angled in one plane and other sections in two planes. In this case, the identically designed components also have removable, snap-on covers which are positioned on the same side of the cable guide as the covers of the sections with two degrees of rotational freedom.

A preferred practical example of the invention is described below in more detail based on the drawings.

Figure 2:
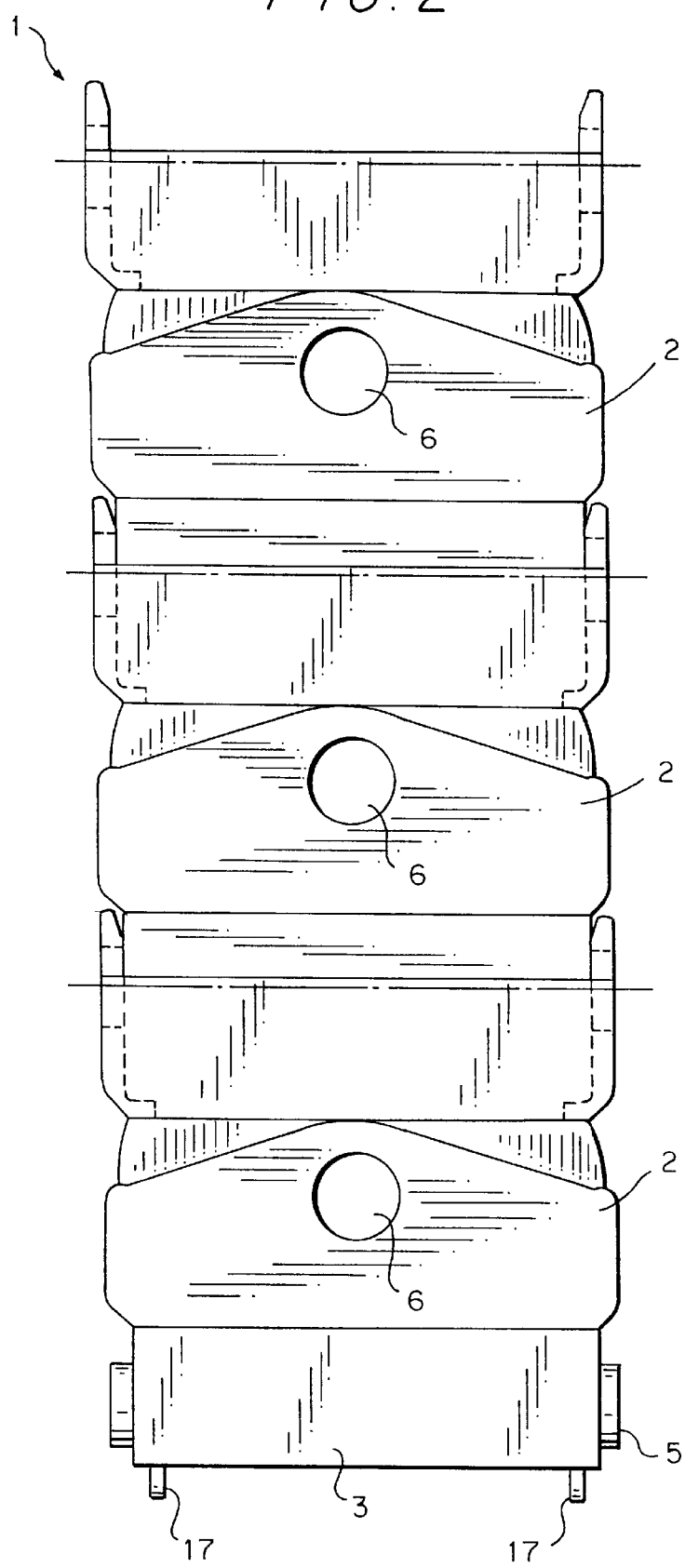
Figure 3:
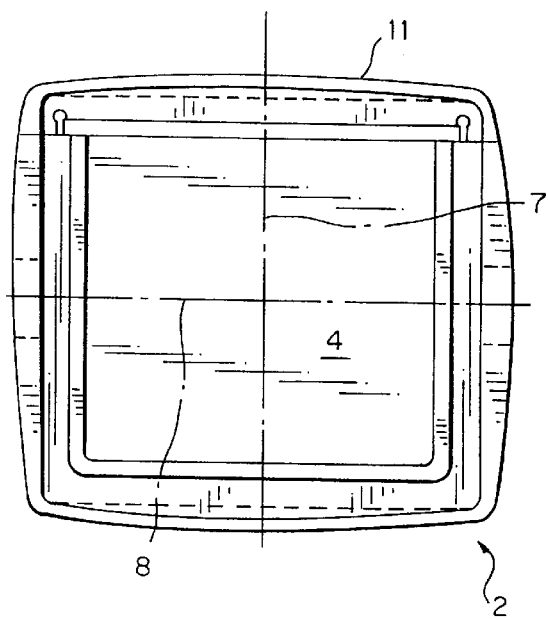
Figure 4:
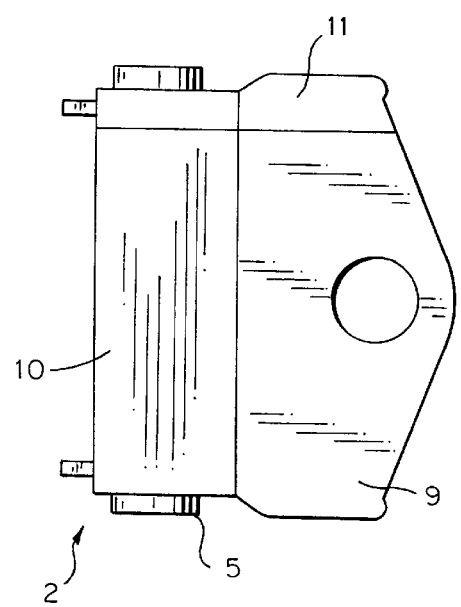
Figure 5:
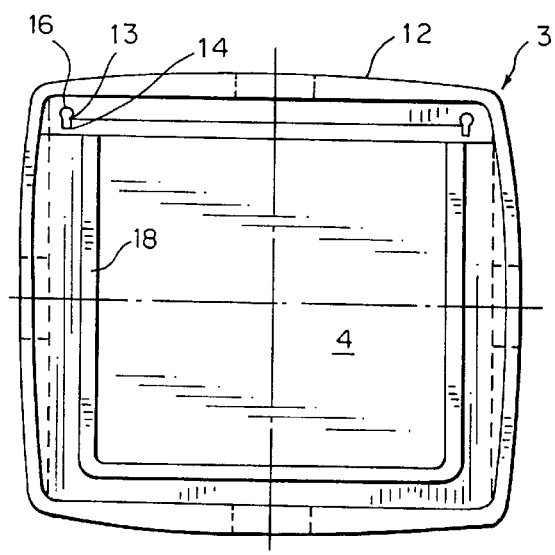
Figure 6:
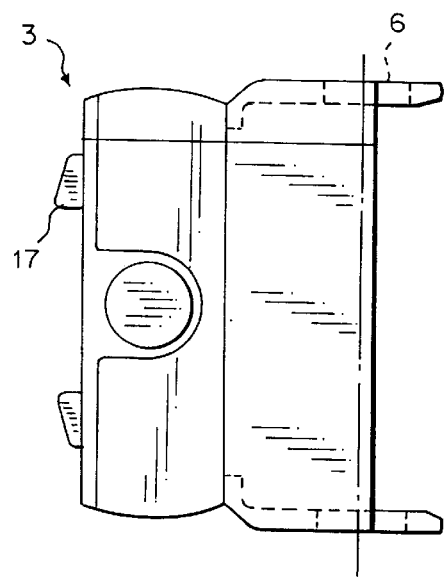
Figure 7:
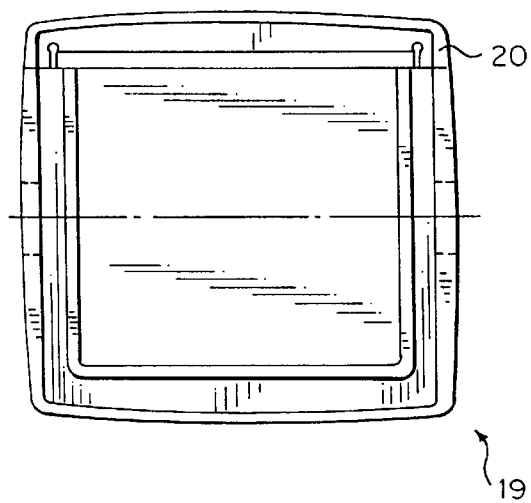
Figure 8:
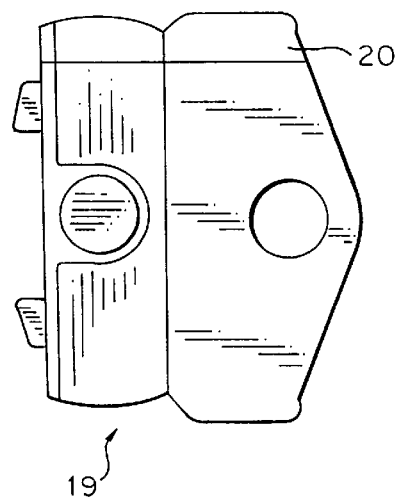
Figure 9:
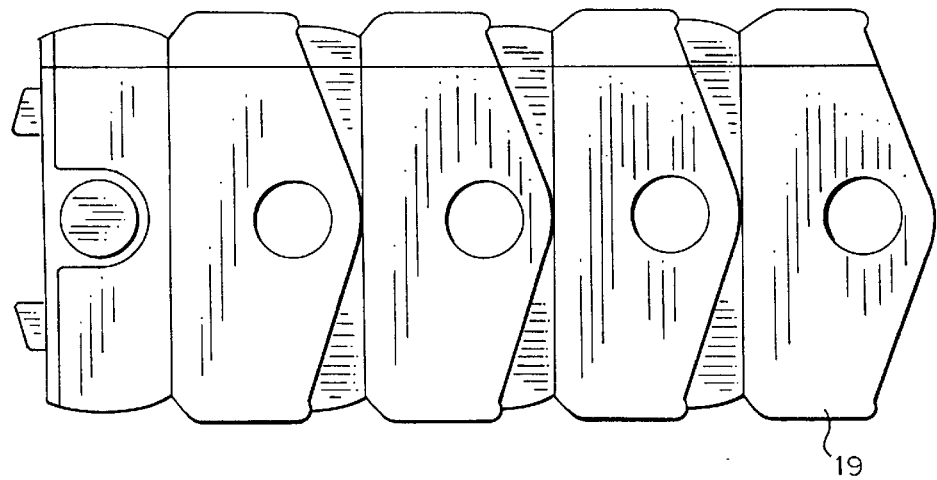
Figure 10:
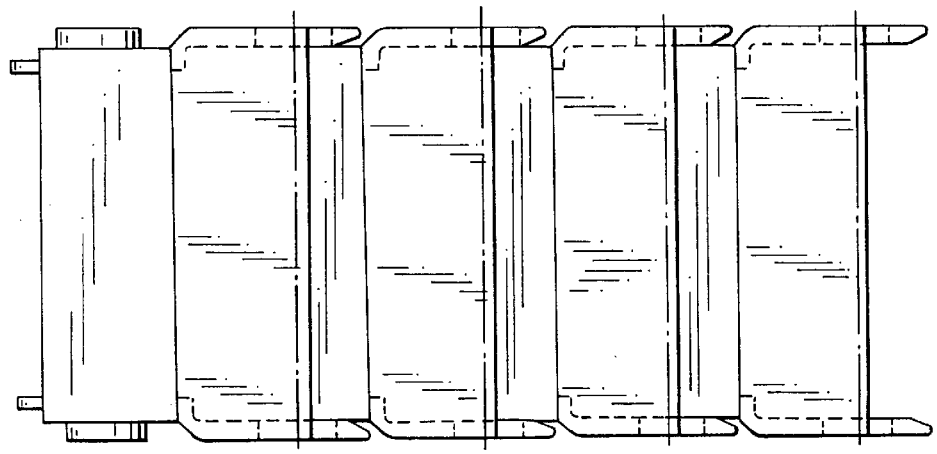

The drawings show the following:

FIG. 1 A section of the cable guide according to the invention, consisting of six individual components, FIG. 2 The section of the cable guide in FIG. 1, rotated by 90°, FIG. 3 The front view of an individual component which has a cover provided with a pin, FIG. 4 A side view of the component in FIG. 3, FIG. 5 A front view of a component which has a cover provided with a hole, FIG. 6 A side view of the component in FIG. 5, FIG. 7 A front view of a component designed for articulated connection to a component identical to itself, FIG. 8 A side view of the component in FIG. 7, FIG. 9 A section of the cable guide consisting of several identical elements, and FIG. 10 The section of the cable guide in FIG. 9, rotated by 90°.

As the drawings illustrate, the cable guide 1 according to the invention consists of numerous rectangular or square, articulated individual components 2, 3. Each individual component 2, 3 surrounds a cavity 4 for holding cables. The outside surfaces of the components 2, 3 each have two pins 5 and two holes 6, where the holes 6 define an articulation axis 8 and the pins 5 define a second articulation axis 7. The holes 6 and the pins 5 are each positioned on opposing lateral surfaces of the components 2, 3, so that the two articulation axes 7, 8 are positioned perpendicular to one another and perpendicular to the longitudinal axis of the cable guide. The holes 6 are designed to match the pins 5, so that the individual components 2, 3, which are preferably made of thermoplastic material, can be joined to form an extensively closed cable duct. In accordance with the position of the holes 6 and pins 5, the components 2, 3 can only be joined in such a way that the articulation axes of two adjacent components 2, 3 are positioned at an angle of 90° to one another, so that the cable guide 1 has two degrees of rotational freedom.

Each component 2, 3 has an area with a long outside edge length 9 and an area with a shorter outside edge length 10, where the holes 6 are positioned in the area with the long outside edge length 9 and the pins 5 in the area with the shorter outside edge length 10. When the individual components 2, 3 are connected to form a single strand, each of the areas with a long outside edge length 9 surrounds the area of shorter outside edge length 10 of the adjacent component 2, 3, where the pins 5 of a component 2, 3 engage the respective holes 6 of the adjacent component 2, 3. In order for the mutually surrounding and overlapping areas of adjacent components 2, 3 to be tightly positioned against one another in every angled position of the components 2, 3, the outside surfaces of the components extending roughly parallel to the articulation axis 7 defined by the pins 5 have a concave shape in the region of the shorter outside edge length 10.

Two different basic shapes are envisaged for the components 2, 3. Component 2, shown in FIGS. 3 and 4, has a removable, snap-on cover 11 provided with a pin 5. Component 3, shown in FIGS. 5 and 6, is also provided with a removable, snap-on cover 12. However, the cover 12 of this component 3 has a hole 6. This means that the cover 11 of component 2 is positioned on the side of a pin 5 and the cover 12 of component 3 is positioned on the side of a hole 6 which matches the pin 5. If the two different basic shapes of components 2, 3 are alternatingly connected, all of the covers 11, 12 are located on one side of the cable guide 1, so that the cable guide 1 can be opened on one side by removing the covers 11, 12 in order to insert the cables. In this context, the covers 11, 12 of adjacent components 2, 3 overlap so that, beginning at one end of the cable guide 1, they can be consecutively removed and then reconnected in reverse order. In this context, it is also conceivable to design the fit of the holes 6 and the pins 5 in such a way that all covers 11, 12 can be pulled off in a continuous strip. Each side of the covers 11, 12 which rests on the body of the components 2, 3 is provided with a groove 13 which interacts with corresponding tongues 14 of the components 2, 3. The outer ends of the tongues 14 have a bead-shaped enlargement 15 which snaps into the corresponding recess of the grooves 13.

The front ends of the components 2, 3 have stop bosses 17 in the area with a shorter outside edge length 10 which hit against a stop 18 on the respectively adjacent component 2, 3 when the components 2, 3 are angled relative to one another. Thus, the components 2, 3 can only be angled to a limited degree relative to one another, so that the cables located in the cable guide 1 cannot be subjected to excessive bending stress.

The pins 5 lie roughly flush with the outside contour of the components 2, 3 or with the top edge of the holes 6.

In addition to the various basic shapes of components 2, 3 already described in detail, it is also conceivable to construct part of a cable guide from components 19 having only one degree of rotational freedom in relation to one another. In this way, some sections of the cable guide 1 can only be angled in one plane and other sections in two planes.

A section of the cable guide 1 which is constructed from these kinds of elements 19 having only one degree of rotational freedom in relation to one another is illustrated as an example in FIGS. 8 to 10. As FIG. 8 shows, component 19 depicted there has one hole 6 and one pin 5, each on one side. The cover 20 of component 19 lies roughly parallel to the articulation axes defined by the holes 6 and the pins 5.

REFERENCE NUMBERS

1 Cable guide
2, 3, 19 Components
4 Cavity
5 Pins
6 Holes
7, 8 Articulation axes
9 Area with a long outside edge length
10 Area with a shorter outside edge length
11, 12, 20 Covers
13 Groove
14 Tongue
15 Enlargement
16 Recess
17 Stop boss
18 Stop

I claim:

1. Cable guide comprising of articulated individual components (2, 3) which are open at the front and made of elastomeric plastic, where articulation axes (7, 8) of the components (2, 3) run transversely to the longitudinal axis of the cable guide (1) and the individual components are linked together, at least in sections, with articulation axes (7, 8) of two adjacent components (2, 3) are positioned at 90° to one another, characterised in that two different, alternating basic shapes are included for the components (2, 3) in the section concerned, each of which has an openable wall element which extends across the entire length of the component concerned and is positioned in such a way that the openable wall elements of adjacent components (2, 3) with offset articulation axes (7, 8) are located on the same side of the cable guide (1), with each component (2, 3) having opposing holes (6) and matching opposing pins (5) in order to form an articulated connection with two adjacent components (2, 3) and one component (3) having a cover (12), which constitutes the openable wall element of this component (3), provided with a hole (6) and the adjacent component (2) having a cover (11), which constitutes the openable wall element of this component (2), provided with a pin (5).

2. Cable guide as per claim 1, characterised in that, except for their front sides including the openable wall elements, the components (2, 3) are of largely closed design and partially overlap.

3. Cable guide as per claim 2, characterised in that the wall elements are designed as removable, snap-on covers (11, 12).

4. Cable guide as per claim 3, characterised in that the connection of the covers (11, 12) to the components (2, 3) is designed as a tongue-and-groove joint (13, 14).

5. Cable guide as per claim 4, characterised in that the tongue-and-groove joint (13, 14) is designed to snap together positively.

6. A cable guide having a front side and comprising components rotatably coupled by pivots, wherein the pivots alternate between a first pivot axis transverse to the guide and generally parallel to the front side, and a second axis transverse to the guide and generally perpendicular to the front side;

the components each including a respective openable wall element on the front side;

wherein the components in cross include a rectangle and wherein the openable wall element comprises substantially one side of the rectangle; and wherein the components include a first component shape and a second component shape disposed alternatingly along the cable guide.

* * * * *